No. 734,220. PATENTED JULY 21, 1903.
F. BRYAN & A. H. BAYLEY.
COMBINATION INTERNAL COMBUSTION AND COMPRESSED OR LIQUID GAS OR COMPRESSED OR LIQUID AIR ENGINE.
APPLICATION FILED FEB. 26, 1901.
NO MODEL.
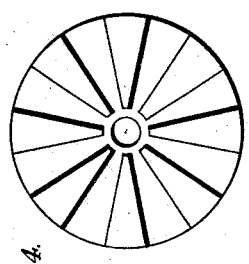
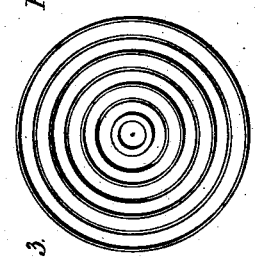
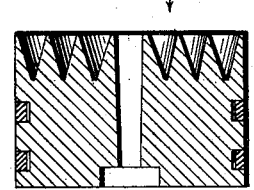
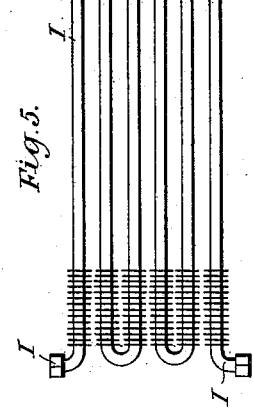
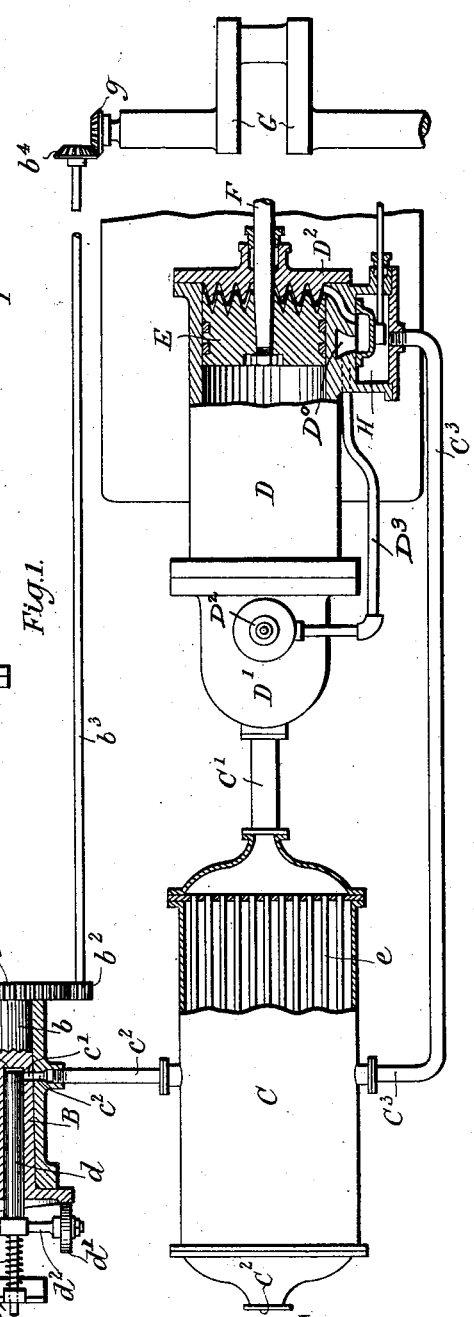
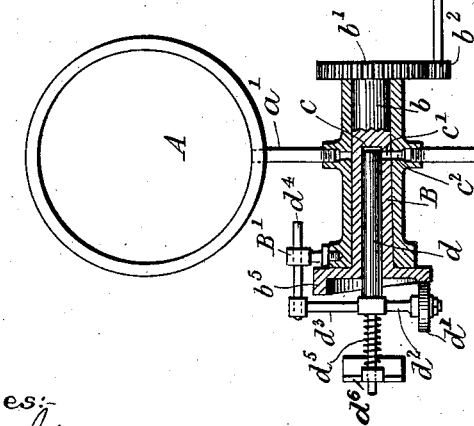
Witnesses:-
Stephen Hinsta.
Percy C. Bowen.
Inventors-
Frank Bryan
and A. H. Bayley
by Wilkinson & Fisher
Attorneys.

No. 734,220. Patented July 21, 1903.

UNITED STATES PATENT OFFICE.

FRANK BRYAN, OF LONDON, AND ABEL H. BAYLEY, OF NITON, ISLE OF WIGHT, ENGLAND.

COMBINATION INTERNAL-COMBUSTION AND COMPRESSED OR LIQUID GAS OR COMPRESSED OR LIQUID AIR ENGINE.

SPECIFICATION forming part of Letters Patent No. 734,220, dated July 21, 1903.

Application filed February 26, 1901. Serial No. 48,973. (No model.)

*To all whom it may concern:*

Be it known that we, FRANK BRYAN, electrical engineer, residing at 87 Wellesley road, Gunnersbury, London, and ABEL HENRY BAY-LEY, residing at Reeth Lodge, Niton, Isle of Wight, England, subjects of the King of Great Britain, have invented a Combination Internal-Combustion and Compressed or Liquid Gas or Compressed or Liquid Air Engine, of which the following is a specification.

This invention relates to a combination internal-combustion and compressed or liquid gas or compressed or liquid air engine, and is primarily designed for utilizing liquid air or liquid gas, more especially in a motor.

In using compressed or liquefied air or gas alone as the motive power in an engine it is well known that upon the expansion of the compressed or liquefied air or gas thereby heat is absorbed from its surroundings and a considerable reduction of temperature of its surroundings (adjacent air or gases, cylinderwalls, &c.) takes place, and this lowering of the temperature reduces the efficiency of such engines or motors and in some cases precludes the working thereof by reason of the valves becoming frozen up, solid ice forming in the exhaust-passages, &c.

We will now proceed to describe, with reference to the accompanying drawings, the present invention, which is more especially designed for utilizing liquid air or liquid gas as the motive power or part of the motive power or one of the sources of power in a motor.
Figure 1 is a plan view, parts being shown in section, of a combination liquid air and internal-combustion motor according to the present invention. Fig. 2 is a local detail view, on an enlarged scale, of the motor-piston according to the present invention. Fig. 3 is an end view of Fig. 2 looking in the direction of the arrow 3, Fig. 2. Fig. 4 shows an alternative form of constructing the end of the piston and the interior end of the cylinder.
Fig. 5 shows an alternative form of converter, as hereinafter explained.

A is a vessel or reservoir of any suitable size and character adapted to receive and hold the supply of liquid air, such reservoir A being coated or protected with any suitable heat-non-conducting material—such, for instance, as felt—for preventing as far as possible the heat of the atmosphere from reaching the liquefied air in said vessel A.

B is the valve or means by which the supply of liquid air can be regulated and delivered into the converter C.

D is the motor-cylinder, such cylinder being double-acting—namely, on one side of the piston, at the end D' of the cylinder, the engine is an internal-combustion engine—that is, the motive power is caused by an explosion of any suitable combustible mixture, (gas or liquid hydrocarbons,)—while on the other side of the piston—that is, at the other end of the cylinder—the motive power employed is the expanded or converted liquid air, or any other compressed gas or air may be employed.

E is the piston.
F is the piston-rod.
G is the crank and crank-shaft operated by said piston-rod F.

The liquid-air reservoir A is connected by a pipe $a'$ to the interior of the valve-casing B.
$b$ is a circular plug or rotary valve fitting in and adapted to rotate within said casing B, said valve being conical, if desired, for accuracy of fitting, and this rotary valve is rotated by any suitable means from the motor—
for instance, by the toothed wheel $b'$, driven by the toothed wheel $b^2$ on the shaft $b^3$, which latter is revolved by the bevel-gear $b^4$, which is driven by the bevel-gear $g$ on the crankshaft G. This rotary valve $b$ has a longitudinal bore $c$ through a part of the length thereof and a lateral passage or opening $c'$ from said bore $c$ through the side of said rotary valve $b$ in position to alternately coincide with the inlet-pipe $a'$ and the outlet-pipe $c^2$, leading to the converter C. In this bore $c$ a closely-fitting plunger $d$ is adapted to reciprocate endwise, while permitting the rotary valve $b$ to revolve around said plunger $d$. Reciprocation may be imparted to said plunger by any suitable means—such, for instance, as a cam $b^5$, fixed or formed on the end of the rotary valve $b$, which cam $b^5$ as the valve $b$ rotates will ride against the roller $d'$, carried on the arm or cross-head $d^2$, fixed on the plunger $d$—another arm $d^3$, extending from said plunger $d$, being provided with a guide-pin $d^4$, adapted to slide in a guide B', mounted on the casing B, a spring, such as $d^5$, of suitable strength (advantageously adjustable) being arranged to act in the opposite direction to the cam $b^5$ for the purpose of returning said plunger after same has been forced out by the cam. Thus as the valve rotates it will receive through the passage $a'$ and through the aforesaid opening $c'$ into the aforesaid bore $c$ of said plunger its quantum of liquid air (or gas) from the reservoir A, (the plunger $d$ at this moment being out by reason of same having been moved by the cam $b^5$ against the action of the aforesaid spring $d^5$,) and then as the rotation of said valve $b$ continues it will cut off and close communication with such reservoir A and thereafter open communication through the pipe $c^2$ when the opening $c'$ has been moved around to coincide with the opening $c^2$ of the converter C, and at this moment the cam $b^5$ will be moved clear of the roller $d'$ and leave the spring $d^5$ free to force the plunger $d$ into the bore $c$, and thereby expel the charge of liquid air or gas from the valve into said converter C. The tension of the spring $d^5$ is regulated by a suitable engaging nut $d^6$ and is so adjusted as to exert only a predetermined amount of pressure on the plunger $d$—namely, a pressure according to the pressure which we wish to maintain in the converter C—and consequently should the pressure in said converter C (or other intermediate vessel) exceed said predetermined amount such spring $d^5$ will then be unable to force the liquid out of the valve, and consequently the plunger $d$ will remain out, and the charge of liquid air in the bore $c$ will remain in the valve $b$ until the opening $c'$ comes around again opposite to the opening $c^2$, when if the opposing pressure in the converter C is now reduced the said charge of liquid air will then be forced out of the valve into the converter C, and so on, or, if desired, a sliding valve can be employed instead of a rotary valve.

The converter C consists of a cylindrical or other suitably-shaped closed-in vessel, which is provided with a series of tubes $e$ after the manner of the well-known surface condensers used in steam-engines, &c.

The products of combustion are led from the end D'—i. e., internal-combustion end—of the motor D through the exhaust-passage C' and caused to pass through the series of tubes $e$ (which are thereby heated) and escape through the exhaust-outlet $C^2$. The liquid air, which is fed as aforesaid to the interior of the converter C, is expanded therein, on the outside surface of the tubes $e$, without coming in contact with the products of combustion, and thence such expanded air passes through the expanded-air outlet $C^3$ to the valve-chamber H at the end of the cylinder D opposite to the internal-combustion end D', and thence said expanded air (which is of course under great pressure) is admitted to its end of the cylinder by a slide or other suitable valve. It will thus be seen that we utilize the heat of the exhaust from the internal-combustion motor for the purpose of converting the liquid air in order to render the latter applicable as motive power.

An important feature of the present invention consists in the novel form of piston and cylinder end employed in the end of the motor in which the compressed air coming from the converter C is utilized—namely, the piston E on the compressed-air side thereof and the interior of the end $D^2$ of the cylinder D are respectively formed or provided with gills or other extended surfaces, so as to offer as much surface as possible to such compressed air, and thus facilitate the exchange of heat between the latter and the cylinder and piston. Two examples of carrying out this part of the present invention are shown in the drawings—namely, in Figs. 1, 2, and 3 we have illustrated a series of concentric channels formed on the face of the piston, thus forming a series of concentric raised surfaces, and similarly on the inner wall of the end $D^2$ of the cylinder, the position of said concentric rings or ridges on said piston E and cylinder end $D^2$ being so arranged that the said concentric rings or raised surfaces will intersect and fit closely within one another without touching when the piston E is at the end of its stroke toward said end of the cylinder. In Fig. 4 we have illustrated an alternative form of gills or extended surfaces—viz., a series of sector-shaped surfaces regularly spaced apart and arranged radially around the longitudinal axis of said piston and cylinder, respectively. We consider it more advantageous to employ such extended surfaces both on the cylinder end and piston end, as hereinbefore described, yet, if desired, the extended surfaces may be used on the piston only or on the cylinder end only.

We do not consider it necessary to herein more fully describe and illustrate the internal-combustion motor or internal-combustion part of this engine, as any suitable arrangement and construction thereof may be employed, and such internal-combustion motors *per se* being well known therefore any person skilled in the art thereof can readily carry out this part of the construction of the motor without further description from us.

The operation is as follows: The heated exhaust from the internal-combustion part of the motor coming through the pipe C' of the converter C thereby serves to heat and convert the liquid air, and the latter is thereby expanded and is then utilized on the side of the piston E having the aforesaid extended surfaces and there further expanded and finally allowed to escape; or, if desired, such expanded air may be further utilized in any desired manner—as, for instance, the cylinder D may be jacketed and such exhaust and expanded air caused or allowed to flow through said jacket, and thereby serve to keep the cylinder cool. The expanded liquid air, acting on the extended surfaces of the piston and cylinder end, as well as acting on the interior wall of said cylinder D, will tend to cool same, while, on the other hand, the internal combustion taking place on the other side of said piston will tend to heat said cylinder and piston, and consequently these two effects will tend to neutralize one another—that is to say, the heat from the internal-combustion end of the engine will serve to keep the compressed-air end of the engine more or less heated, while, on the other hand, the expanding air in the compressed-air end will absorb the heat arising from said internal combustion, greater efficiency of the compressed-air part of the engine consequently being obtained than would be the case with a motor where compressed air alone is used.

Another feature of the present invention consists in leading a part of the exhaust expanded air from the compressed-air end of the engine to the air-supply for the internal-combustion end of the engine, such expanded air containing a larger proportion of oxygen than ordinary atmospheric air, and consequently will produce a more highly-explosive mixture when combined with the ordinary hydrocarbons. In Fig. 1 we have shown one method of accomplishing this end by means of the connecting-pipe $D^3$, forming a communication between the exhaust-passage $D^0$ and the gas and air inlet $D^4$ for supplying the combustion end of the engine with the exhaust expanded air, as described.

In place of the converter C (shown in Fig. 1) we may employ any other suitable form of converter—such, for instance, as that shown in Fig. 5, in which is illustrated a coil or pipe I, through which the liquid air may be caused to flow, such coil being mounted inside a casing, such as $c$, through which latter the exhaust from the internal-combustion motor would flow, as in Fig. 1, the coiled pipe I being provided with a series of gills or surfaces adapted to absorb heat from said exhaust.

The herein-described method of automatically regulating the supply of liquid air (or liquid gas) to the converter, such as C or a converter such as shown in Fig. 5 of the drawings hereunto annexed or other suitable converter, which consists in placing each separate charge of liquid air or liquid gas in a feed-chamber, such as $c$, and placing such charge under pressure in said feed-chamber—for instance, by means of an adjustable spring $d^5$, acting on the plunger $d$ when released by the cam—and adjusting such pressure or employing only such pressure on such charge as to expel the latter from the feed-chamber into the converter only when the pressure in the latter lies below the required working pressure, for the air may be utilized for any other purpose for which same may be applicable—such, for instance, as when utilizing liquid air for refrigeration purposes, &c.

Instead of heating the converter by means of the exhaust from the explosion end of the motor, as illustrated, it is obvious that the heat for said converter may be obtained from any other suitable source or the converter heated in any well-known way.

Many other modifications might be made without departing from the spirit of our invention; but

What we claim, and desire to secure by Letters Patent of the United States, is—

1. In a liquid air or gas engine, the combination with the supply-reservoir and converter, of a movable measuring-chamber having ports adapted to alternately communicate with said reservoir and converter and automatically deliver the measured charge to the converter in direct opposition to the pressure in the converter when the pressure in the same is below the required working pressure.

2. In apparatus for the reconversion of liquid air or gas the combination with a reservoir and pipe for continuously supplying such liquid, of a movable measuring-chamber adapted to receive and hold a measured charge of such liquid, means to open communication from said chamber to the converter after closing communication from said chamber to the reservoir, and mechanical means for exerting a predetermined amount of pressure on said charge to expel said charge into the converter in direct opposition to the pressure in the converter only when the pressure in the latter lies below the required working pressure for the air, substantially as and for the purposes hereinbefore described.

3. In a liquid air or gas engine, the combination with the supply-reservoir and converter; of a hollow valve or measuring-chamber in communication with said reservoir and converter; means connected to said engine for operating said valve; and a plunger operating in said valve for delivering a charge to the converter when the pressure in the same is below the required working pressure.

4. In a liquid air and gas engine, the combination with the supply-reservoir and converter; of a communicating chamber between said reservoir and converter, a hollow valve mounted in said chamber, adapted to receive a charge from said reservoir, means connected to said engine for rotating said valve; and an automatically-operated plunger operating in said hollow valve for delivering said charge to the converter when the pressure in the same is below the required working pressure.

5. In a liquid air and gas engine, the combination with the supply-reservoir and converter; of a communicating chamber between said reservoir and converter, a hollow valve rotatably mounted in said chamber, adapted to receive a charge from said reservoir, means connected to said engine for rotating said valve, a plunger operating longitudinally of said valve, a cam on said valve engaging said plunger for forcing the same outwardly and a spring engaging said plunger for returning the same to its initial position and delivering a charge to the converter when the pressure in the same is below the required working pressure.

6. A combined internal-combustion and compressed or liquid air or gas engine consisting of the combination with a reservoir A of a converter C, a measuring feed-valve for controlling and regulating the supply of said liquid air or gas from the reservoir A to said converter C, a passage communicating from the exhaust of the internal-combustion engine to the interior of said converter, an air-pipe to lead the expanded air from said converter to the compressed-air end of the engine, and extended surfaces on the face of the piston against which the compressed air impinges to thereby facilitate the interchange of heat, substantially in the manner and for the purposes hereinbefore described.

7. A combined internal-combustion and compressed or liquid air or gas engine consisting of the combination with a reservoir A of a converter C, a measuring feed-valve for controlling and regulating the supply of said liquid air or gas from the reservoir A to said converter C, a passage communicating from the exhaust of the internal-combustion engine to the interior of said converter, an air-pipe to lead the expanded air from said converter to the compressed-air end of the engine, extended surfaces on the inside face of the cylinder end against which said compressed air impinges to thereby facilitate the interchange of heat substantially in the manner and for the purposes hereinbefore described.

8. A combined internal-combustion and compressed or liquid air or gas engine consisting of the combination with a reservoir A of a measuring feed-valve for controlling and regulating the supply of said liquid air or gas from the reservoir A to said converter C, a passage communicating from the exhaust of the internal-combustion engine to the interior of said converter, an air-pipe to lead the expanded air from said converter to the compressed-air end of the engine, extended surfaces on the face of the piston against which the compressed air impinges, and extended surfaces on the inside face of the cylinder end against which said compressed air also impinges to thereby facilitate the interchange of heat, substantially in the manner and for the purposes hereinbefore described.

In witness whereof we have hereunto set our hands in presence of two witnesses.

F. BRYAN.
ABEL H. BAYLEY.

Witnesses:
 A. NUTTING,
 H. D. JAMESON.